(12) United States Patent
Lakhotia et al.

(10) Patent No.: US 10,239,697 B2
(45) Date of Patent: Mar. 26, 2019

(54) FLEXIBLE ELEMENT FOR A CONVEYOR SYSTEM

(71) Applicants: Aswini Lakhotia, Rajajinagar Bangalore (IN); Murugesh G. Chittaragi, Nagar Bangalore (IN)

(72) Inventors: Aswini Lakhotia, Rajajinagar Bangalore (IN); Murugesh G. Chittaragi, Nagar Bangalore (IN)

(*) Notice: Subject to any disclaimer, the term of this patent is extended or adjusted under 35 U.S.C. 154(b) by 0 days.

(21) Appl. No.: 15/512,559

(22) PCT Filed: Aug. 21, 2014

(86) PCT No.: PCT/IN2014/000533
§ 371 (c)(1),
(2) Date: Mar. 19, 2017

(87) PCT Pub. No.: WO2015/193907
PCT Pub. Date: Dec. 23, 2015

(65) Prior Publication Data
US 2017/0217686 A1    Aug. 3, 2017

(30) Foreign Application Priority Data

Jun. 19, 2014    (IN) .......................... 2977/CHE/2014

(51) Int. Cl.
| *B65G 17/12* | (2006.01) |
| *B65G 17/38* | (2006.01) |
| *B65G 23/16* | (2006.01) |
| *B65G 17/06* | (2006.01) |
| *B65G 39/20* | (2006.01) |
| *B65G 21/22* | (2006.01) |

(52) U.S. Cl.
CPC .......... *B65G 23/16* (2013.01); *B65G 17/066* (2013.01); *B65G 17/38* (2013.01); *B65G 21/22* (2013.01); *B65G 39/20* (2013.01)

(58) Field of Classification Search
None
See application file for complete search history.

(56) References Cited

U.S. PATENT DOCUMENTS

| 3,211,279 | A | | 10/1965 | Smith | |
| 5,054,601 | A | * | 10/1991 | Sjogren | B65G 23/23 198/370.04 |
| 6,425,478 | B1 | * | 7/2002 | Eberle | B65G 23/16 198/795 |
| 7,556,142 | B2 | * | 7/2009 | Stebnicki | B65G 17/40 198/777 |
| 9,365,352 | B2 | * | 6/2016 | Balk | B65G 21/18 |
| 2013/0277182 | A1 | | 10/2013 | Studer | |

* cited by examiner

*Primary Examiner* — Kavel Singh
(74) *Attorney, Agent, or Firm* — Mark M. Friedman

(57) ABSTRACT

A flexible element for conveying goods in a conveyor system is provided. The flexible element includes a base configured to form a top surface, a bottom surface and an intermediate surface; a conveying means detachably mounted on the top surface and; a toothed projection detachably mounted on the bottom surface; and at least one pair of wheels mounted on the intermediate surface. A conveyor system for conveying the flexible element is also provided.

7 Claims, 7 Drawing Sheets

FLEXIBLE ELEMENT FOR A CONVEYOR SYSTEM

FIELD OF INVENTION

The invention generally relates to the field of mechanical engineering. The present invention particularly relates to a conveyor system.

BACKGROUND

Conveyor systems have been known to exist in the art which have been specifically used for conveying the goods from one location to another. There are conveyor systems that are driven by means that include but are not limited to mechanical, electrical and electromechanical. Further, there also conveyor systems that have been customised to handle specific tasks. There have been arrangements which have been provided for conveying the goods. The arrangements include but are not limited to roller bearings, roller mechanisms which have been arranged in complex constructions, often involving an integrated support for mounting the arrangement. The maintenance of these arrangements is difficult. Further, the entire arrangement has to be replaced in case of detection of a wear or a defect in a particular part of the construction. Also, the design of the conveyor system is elaborate that leads to occupation of large areas of work floor. Hence, there is a need for a conveyor system that is compact and flexible which has low maintenance and operating costs.

BRIEF DESCRIPTION OF DRAWINGS:

So that the manner in which the recited features of the invention can be understood in detail, some of the embodiments are illustrated in the appended drawings. It is to be noted, however, that the appended drawings illustrate only typical embodiments of this invention and are therefore not to be considered limiting of its scope, for the invention may admit to other equally effective embodiments.

SUMMARY OF THE INVENTION

One aspect of the invention provides a flexible element for conveying goods in a conveyor system. The flexible element includes a base configured to form a top surface, a bottom surface and an intermediate surface; a conveying means detachably mounted on the top surface; a toothed projection detachably mounted on the bottom surface; and at least one pair of wheels mounted on the intermediate surface. A conveyor system for conveying the flexible element is also provided.

DETAIL DESCRIPTION OF THE INVENTION

Various embodiments of the invention provide a conveyor system.

The conveyor system as briefly explained herein above shall be described in detail as exemplary embodiments of the invention.

Figure 1:
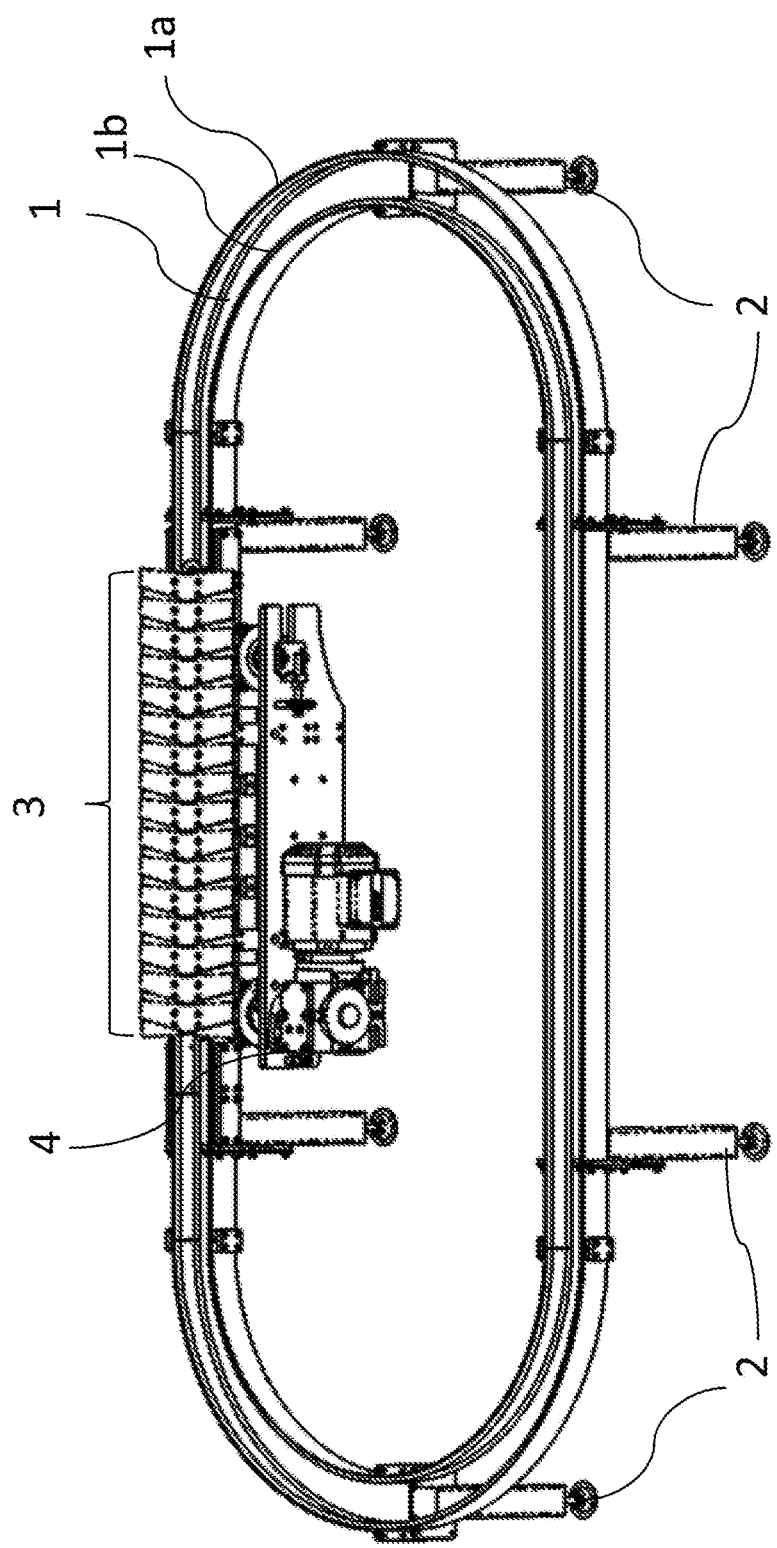
FIG. 1 shows a perspective view of a conveyor system, according to an embodiment of the invention.

FIG. 1 shows a perspective view of a conveyor system, according to an embodiment of the invention. The conveyor system includes a channel 1 having vertically mounted guides 1a and 1b. In one embodiment of the invention, the channel 1 can be a closed loop. Examples of path of the channel include but are not limited to at least one of a linear, a curvilinear, a spiral, a helical or a combination thereof. All such geometrical paths, as can be realized and as construed obvious by a person skilled in the art, are included within the scope of this invention. The channel 1 is supported by a plurality of supports 2 rigidly fixed to the ground. Alternatively, the supports 2 can also be a suspended support. Examples of suspended support include but are not limited to chains, rods, cantilever support or a combination thereof A plurality of flexible elements 3 are mounted on the channel 1 for conveying goods or objects from a given location to a desired location. The flexible elements 3 are driven through the channel by a drive system 4 provided on the channel 1.

Figure 2:
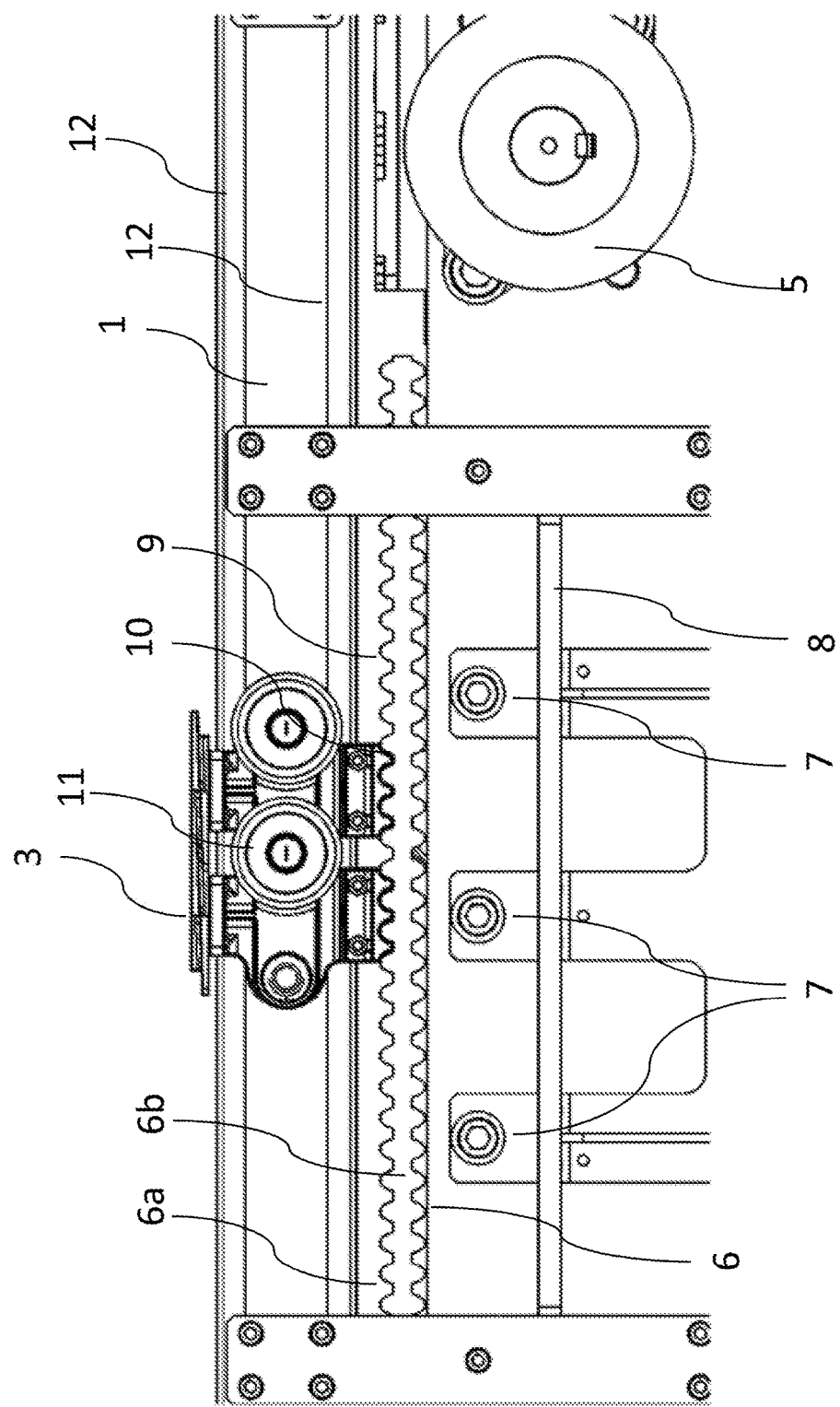
FIG. 2 shows the front view of a drive system for movement of a flexible element, according to an embodiment of the invention.

FIG. 2 shows the front view of a drive system for movement of a flexible element, according to an embodiment of the invention. The drive system includes a motor (not shown) to drive a pulley wheel arrangement. The pulley wheel arrangement includes a plurality of driven pulleys 5 connected through a toothed flexible belt 6. The belt includes toothed projections on both of its surface 6a and 6b. A plurality of anti frictional elements 7 are provided on the bridge 8 to the belt 6. The toothed projection 9 on the surface 6a of the belt 6 is configured to come into contact with a toothed surface 10 of the flexible element 3. The toothed surface 10 is formed to complimentarily establish contact with the toothed projection 9 on the surface 6a of the belt 6. The toothed surface 10 moves along the belt 6 causing motion of a wheel 11 mounted on the flexible element 3. The wheel 11 is configured to move along a pair of guide rails 12 provided on the channel 1. The wheel 11 is designed for frictionless motion along the guide rails without any lubricants.

Figure 3:
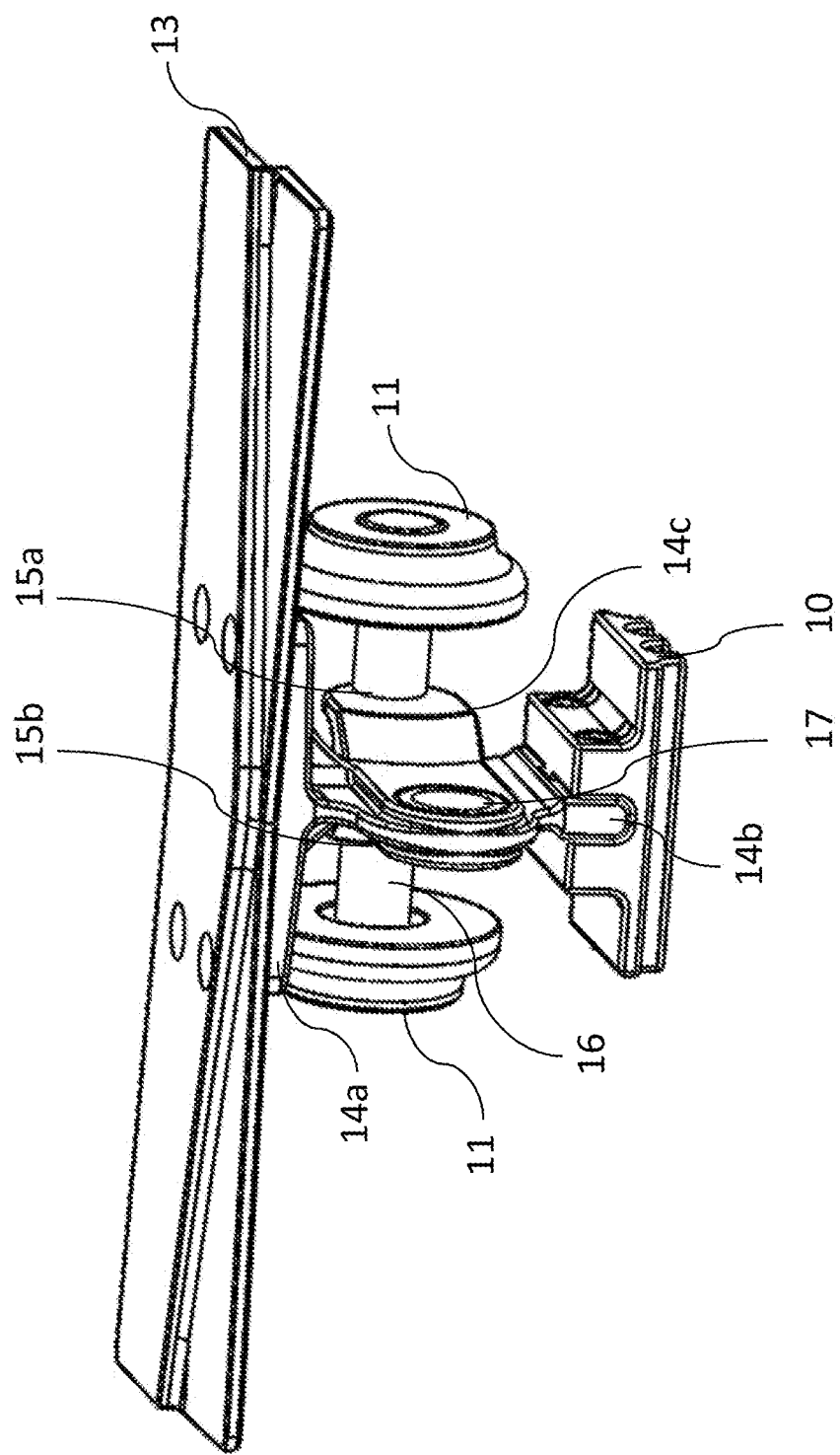
FIG. 3 shows a perspective view of the flexible element, according to an embodiment of the invention.
Figure 4:
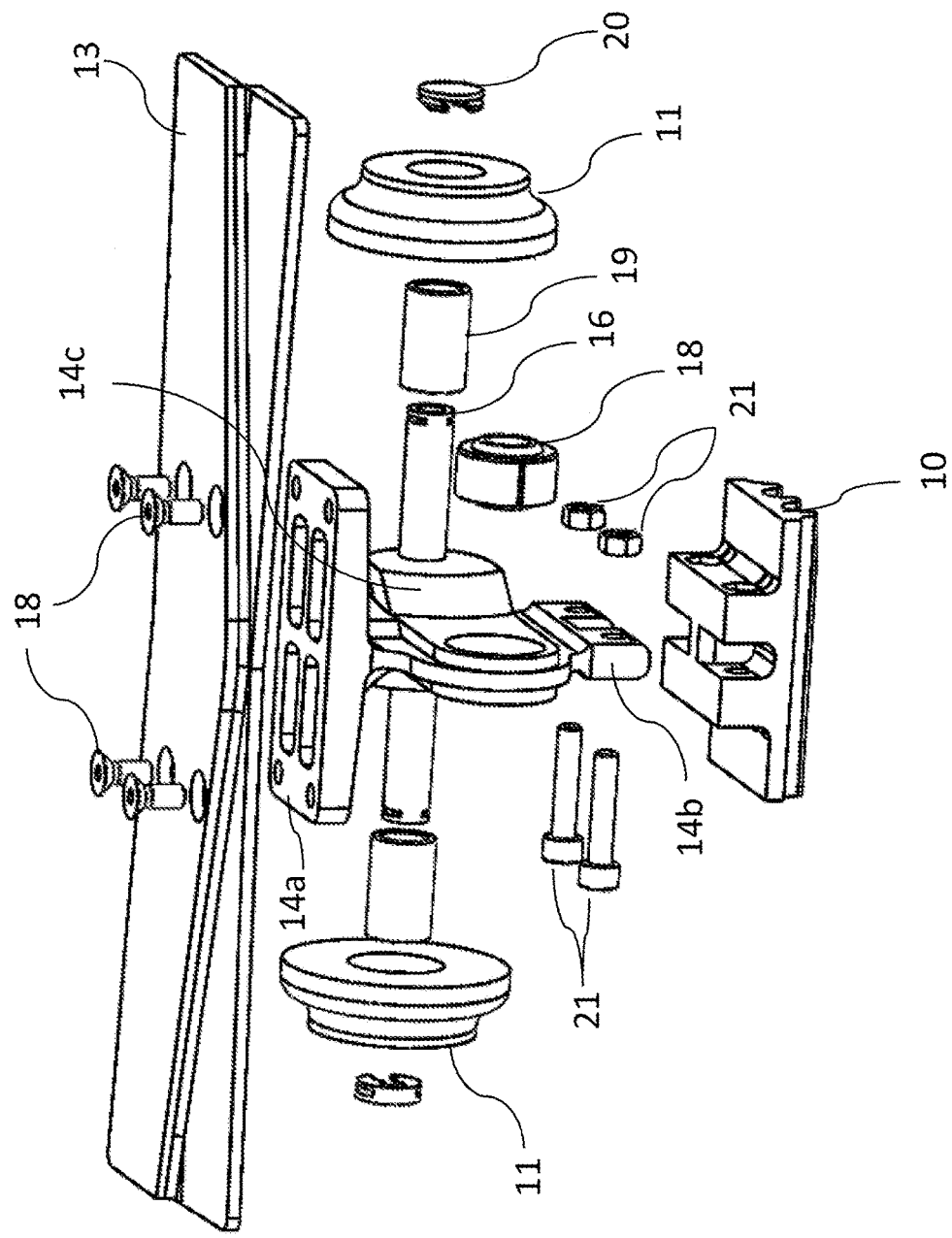
FIG. 4 shows an exploded view of the flexible element, according to an embodiment of the invention.

FIG. 3 and FIG. 4 generally show the flexible element of the conveyor system, according to an embodiment of the invention. FIG. 3 shows a perspective view of a flexible element, according to an embodiment of the invention. The flexible element 3 includes a conveying means 13, which is used as a platform for conveying the objects along the conveyor system. The conveying means 13 is mounted on a base. Examples of conveying means include but is not limited to hooks, bags, baskets, trays and carriers. All such means for carrying goods as construed to be obvious to a person skilled in the art are included within the scope of the invention. The base has a top portion 14a, a bottom portion 14b and an intermediate portion 14c. The top portion 14a is formed to receive the conveying means 13. The bottom portion 14b is configured to receive the toothed surface 10.

The intermediate portion 14c has two slots 15a and 15b for receiving a shaft 16. A first pair of wheels 11 is mounted on the first slot 15a of shaft 16. A bearing 17 is provided on the second slot 15b of the intermediate portion 14c for receiving a second pair of wheels. The flexible element 3 described summarily herein shall be explained in detail through FIG. 4.

FIG. 4 shows an exploded view of the flexible element, according to an embodiment of the invention. Various parts of the flexible element 3, as described in FIG. 3, are detachably connected to each other. The detachable connection of various parts enables quick replacement of the part without the need for elaborate maintenance. The conveying means 13 is fixed to the first portion 14a of the base through detachable means 18. Examples of detachable mean include but is not limited to bolts, screws, nuts, rivets and like.

Figure 5:
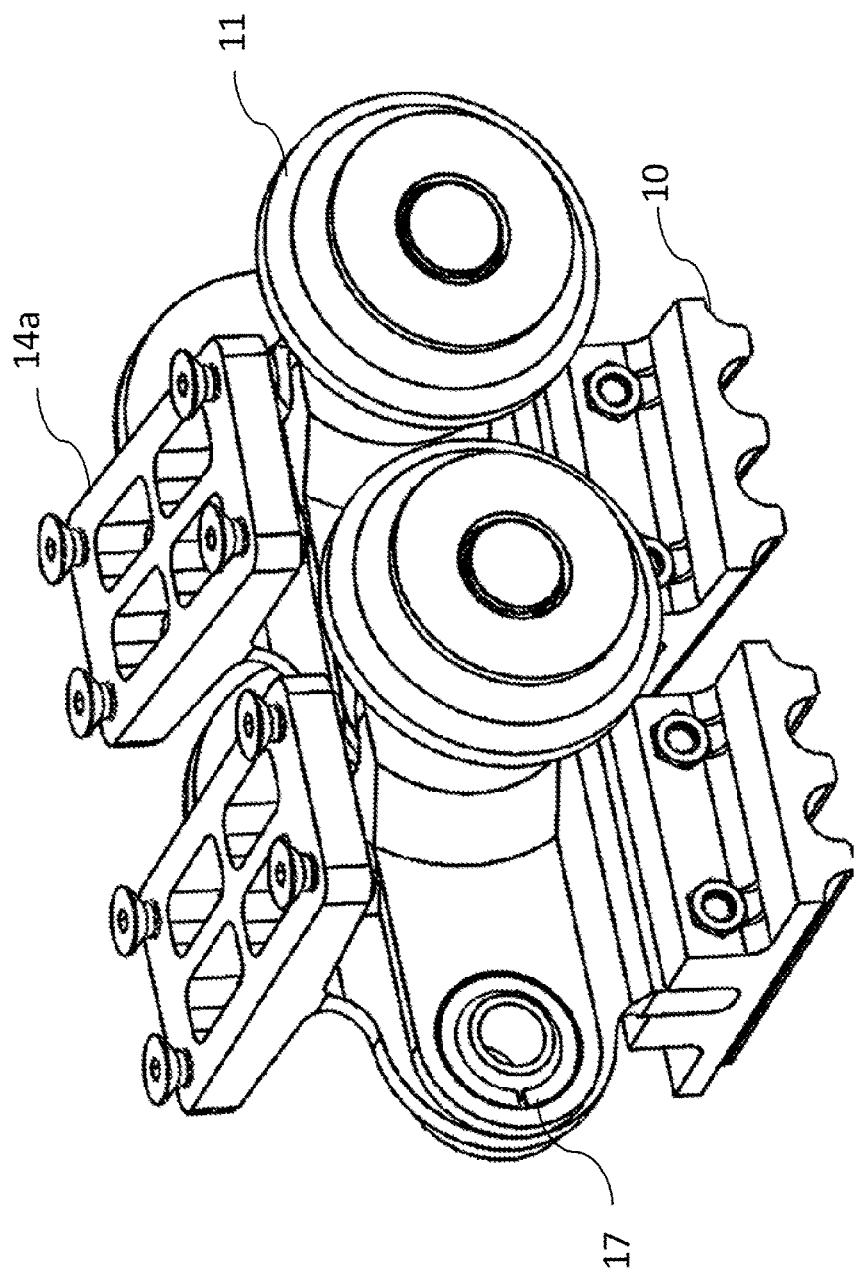
FIG. 5 shows a coupling of two flexible elements, according to an embodiment of the invention.

The pair of wheels 11 is connected to the shaft through a detachable means 18. The wheels 11 are attached to the intermediate portion of the base 14c by using a shaft 16. The Wheels 11 help in guiding the objects on the conveying means along the guide rails 12 (not shown). Further, a spacer 19 and a lock 20 are provided to fix the wheels 11 firmly with the shaft 16. The bottom portion of the base 14b is attached to the toothed surface of the flexible element by the means of mechanical fasteners 21. The mechanical fasteners 21 described herein includes but not limited to bolts, screws, rivets, hex nuts and the like. In one example of the invention, the mechanical fastener 21 is a socket head cap screw and a hex nut. The toothed surface 10 is made from a material with abrasion resistance. The toothed surface 10 is placed such that the tooth faces downwards with respect to the conveying means 13 of the conveyor system. FIG. 5 shows a coupling of two flexible elements, according to an embodiment of the invention. A plurality of flexible elements is coupled in the manner described herein above to form a continuous chain. The continuous chain formed enables seamless movement of goods from one location to a desired location.

Figure 6:
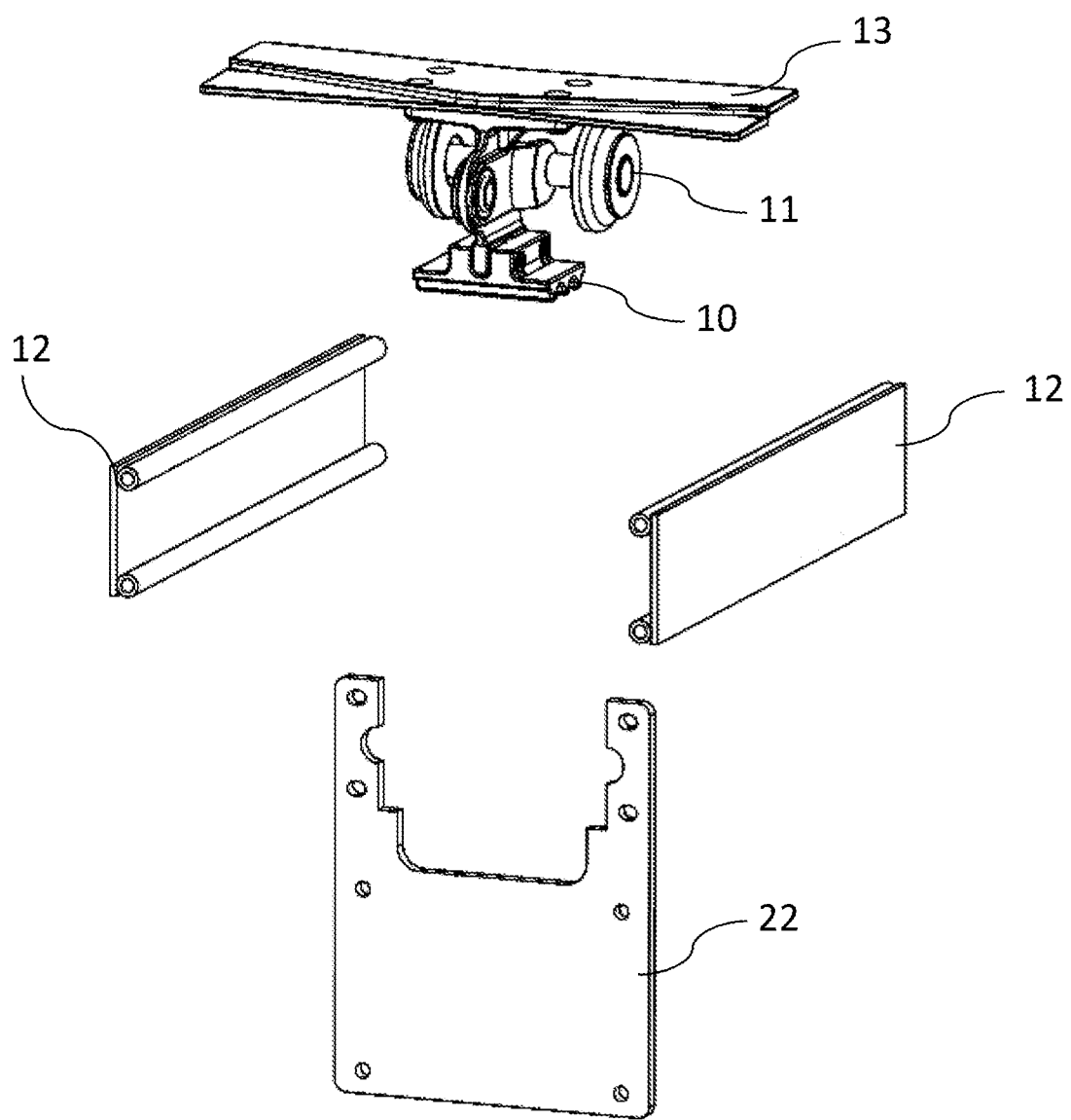
FIG. 6 shows the arrangement for movement of the flexible element, according to an embodiment of the invention.

FIG. 6 shows the arrangement for movement of the flexible element, according to an embodiment of the invention. The arrangement includes a conveying means 13, a pair of wheels 11, a pair of guide rails 12, a toothed surface 10 and a track plate 22. The wheels 11 are configured to move along the pair of guide rails 12. The contour of the wheels 11 and the placement of them in between the track plate 22 is the principle which prevents the uplift, down lift and side shift of the flexible element.

Figure 7:
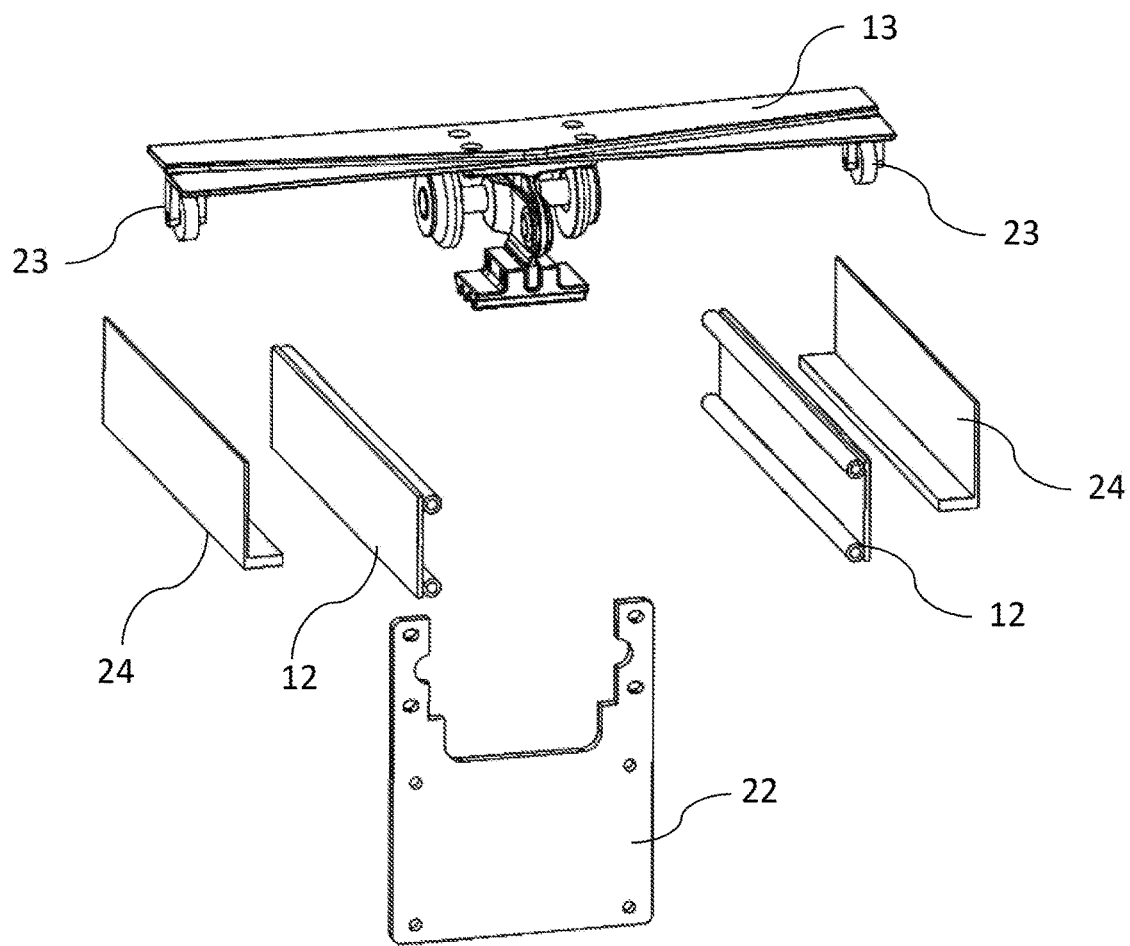
FIG. 7 shows the arrangement for movement of the flexible element, according to an alternate embodiment of the invention.

FIG. 7 shows the arrangement for movement of the flexible element, according to an alternate embodiment of the invention. In the alternate embodiment of the invention, the arrangement is provided with an extended conveying means 13 for movement of flexible element. The extended conveying means 13 is supported by a pair of support-wheels 23, which runs on the support-wheel rail 24 provided.

The foregoing description of the invention has been set for merely to illustrate the invention and is not intended to be limiting. Since modifications of the disclosed embodiments incorporating the spirit and substance of the invention may occur to person skilled in the art, the invention should be construed to include everything within the scope of the appended claims and equivalents thereof.

The invention claimed is:

1. A conveyor system, comprising:
   a channel formed with a pair of guide rails mounted perpendicular to a horizontal surface;
   a flexible element mounted on the channel, the flexible element including a pair of wheels mounted on an intermediate portion of the flexible element, wherein the pair of wheels are configured to complimentarily match the profile of the guide rails and are configured for frictionless motion along the guide rails; and
   a driving element mounted on the channel for initiating motion of the flexible element along a path defined by the channel, wherein the path accommodates motion in three dimensions through at least one section defined by a helical structure.

2. The conveyor system of claim 1, wherein the driving element comprises a pulley belt arrangement for engaging the flexible element.

3. The conveyor system of claim 1, wherein the flexible element includes:
   a base configured to form a top portion, a bottom portion and the intermediate portion,
   a conveying means detachably mounted on the top portion, and
   a toothed projection detachably mounted on the bottom portion.

4. The flexible element of claim 3, wherein the toothed projection engages with the driving element to enable movement of the flexible element.

5. The flexible element of claim 3, wherein the intermediate portion is provided with a pair of slots to receive a shaft for mounting the wheels.

6. The flexible element of claim 5, wherein one of the slots is provided with a coupling element for receiving a second pair of wheels.

7. The flexible element of claim 3, wherein the movement of the toothed projection initiates the guided movement of the wheels.

* * * * *